US008966756B2

(12) United States Patent
Feigleson et al.

(10) Patent No.: US 8,966,756 B2
(45) Date of Patent: Mar. 3, 2015

(54) GAS TURBINE ENGINE STATOR VANE ASSEMBLY

(75) Inventors: Steven J. Feigleson, Falmouth, ME (US); Dennis R. Tremblay, Biddeford, ME (US); William R. Edwards, Stratham, NH (US)

(73) Assignee: United Technologies Corporation, Hartford, CT (US)

( * ) Notice: Subject to any disclaimer, the term of this patent is extended or adjusted under 35 U.S.C. 154(b) by 630 days.

(21) Appl. No.: 13/010,174

(22) Filed: Jan. 20, 2011

(65) Prior Publication Data

US 2012/0189438 A1 Jul. 26, 2012

(51) Int. Cl.
*B23P 15/00* (2006.01)
*F01D 9/04* (2006.01)
*F01D 25/28* (2006.01)

(52) U.S. Cl.
CPC .............. *F01D 9/042* (2013.01); *F01D 25/285* (2013.01); *F05D 2230/60* (2013.01); *F05D 2240/55* (2013.01)
USPC .......................... 29/889.22; 29/458; 29/527.2

(58) Field of Classification Search
CPC F01D 25/285; F01D 2230/60; F01D 2240/50
USPC .......... 415/209.1, 209.2, 209.3, 209.4, 210.1, 415/119; 416/204 R, 213 R, 214 A; 29/458, 29/889.21, 889.22, 527.2
See application file for complete search history.

(56) References Cited

U.S. PATENT DOCUMENTS

| | | | | |
|---|---|---|---|---|
| 4,832,568 | A * | 5/1989 | Roth et al. | 415/189 |
| 5,232,340 | A | 8/1993 | Morgan | |
| 5,281,089 | A | 1/1994 | Brown et al. | |
| 5,380,155 | A | 1/1995 | Varsik et al. | |
| 5,494,404 | A | 2/1996 | Furseth et al. | |
| 5,547,342 | A * | 8/1996 | Furseth et al. | 415/200 |
| 6,202,302 | B1 | 3/2001 | Descoteaux | |
| 6,409,472 | B1 | 6/2002 | McMahon et al. | |
| 6,425,736 | B1 | 7/2002 | McMahon et al. | |
| 6,543,995 | B1 | 4/2003 | Honda et al. | |
| 6,561,760 | B2 * | 5/2003 | Wadia et al. | 415/145 |
| 6,910,859 | B2 | 6/2005 | Bluhm et al. | |
| 7,413,400 | B2 | 8/2008 | Barnett | |
| 7,494,316 | B2 | 2/2009 | Barnett et al. | |
| 7,553,130 | B1 * | 6/2009 | Mons et al. | 415/200 |
| 7,637,718 | B2 | 12/2009 | Barnett et al. | |
| 7,959,408 | B2 * | 6/2011 | Belmonte | 415/209.3 |
| 8,206,100 | B2 * | 6/2012 | Schuler et al. | 415/209.4 |
| 2007/0104574 | A1 * | 5/2007 | Ashley et al. | 415/209.3 |
| 2009/0208332 | A1 * | 8/2009 | Weinstein et al. | 415/209.3 |
| 2010/0166545 | A1 | 7/2010 | Schuler et al. | |
| 2010/0272565 | A1 | 10/2010 | Cheung | |
| 2012/0163978 | A1 * | 6/2012 | Darkins et al. | 416/179 |

* cited by examiner

*Primary Examiner* — Nathaniel Wiehe
*Assistant Examiner* — Woody A Lee, Jr.
(74) *Attorney, Agent, or Firm* — Carlson, Gaskey & Olds, P.C.

(57) ABSTRACT

A method of assembling gas turbine engine front architecture includes positioning inner and outer fairings relative to one another. Multiple vanes are arranged circumferentially between the inner and outer fairings. A liquid sealant is applied around a perimeter of the vanes to seal between the vanes and at least one of the fairings.

2 Claims, 4 Drawing Sheets

GAS TURBINE ENGINE STATOR VANE ASSEMBLY

BACKGROUND

This disclosure relates to a gas turbine engine front architecture. More particularly, the disclosure relates to a stator vane assembly and a method of installing stators vanes within a front architecture.

One type of gas turbine engine includes a core supported by a fan case. The core rotationally drives a fan within the fan case. Multiple circumferentially arranged stator vanes are supported at an inlet of the core by its front architecture.

The stator vanes are supported to limit displacement of the vane, and the vanes are subjected to vibratory stress by the supporting structure. That is, loads are transmitted through the front architecture to the stator vanes. Typically, the stator vanes are constructed from titanium, stainless steel or a high grade aluminum, such as a 2618 alloy, to withstand the stresses to which the stator vanes are subjected.

Some front architectures support the stator vanes relative to inner and outer fairings using rubber grommets. A fastening strap is wrapped around the circumferential array of stator vanes to provide mechanical retention of the stator vanes with respect to the fairings. As a result, mechanical loads and vibration from the fairings are transmitted to the stator vanes through the fastening strap.

SUMMARY

A method of assembling gas turbine engine front architecture includes positioning inner and outer fairings relative to one another. Multiple vanes are arranged circumferentially between the inner and outer fairings. A liquid sealant is applied around a perimeter of the vanes to seal between the vanes and at least one of the fairings.

A gas turbine engine front architecture includes an inlet case having first and second inlet flanges integrally joined by inlet vanes. Outer and inlet fairings respectively fastened to the first and second inlet flanges. The outer and inner fairings respectively include first and second walls having first and second slots respectively. Multiple stator vanes are arranged upstream from the inlet vanes and are circumferentially spaced from one another. Each of the stator vanes extend radially between the inner and outer fairings and include outer and inner perimeters respectively within the first and second slots. Sealant is provided about the inner and outer perimeters at the inner and outer fairings.

The stator vanes include inner and outer ends and provide leading and trailing edges. A notch is provided on the inner end at the trailing edge and seated over the inner fairing. Opposing tabs extend from opposing sides of the stator vanes at the out end. The sealant is provided beneath the notch and the opposing tabs.

BRIEF DESCRIPTION OF THE DRAWINGS

The disclosure can be further understood by reference to the following detailed description when considered in connection with the accompanying drawings wherein.

DETAILED DESCRIPTION

Figure 1:
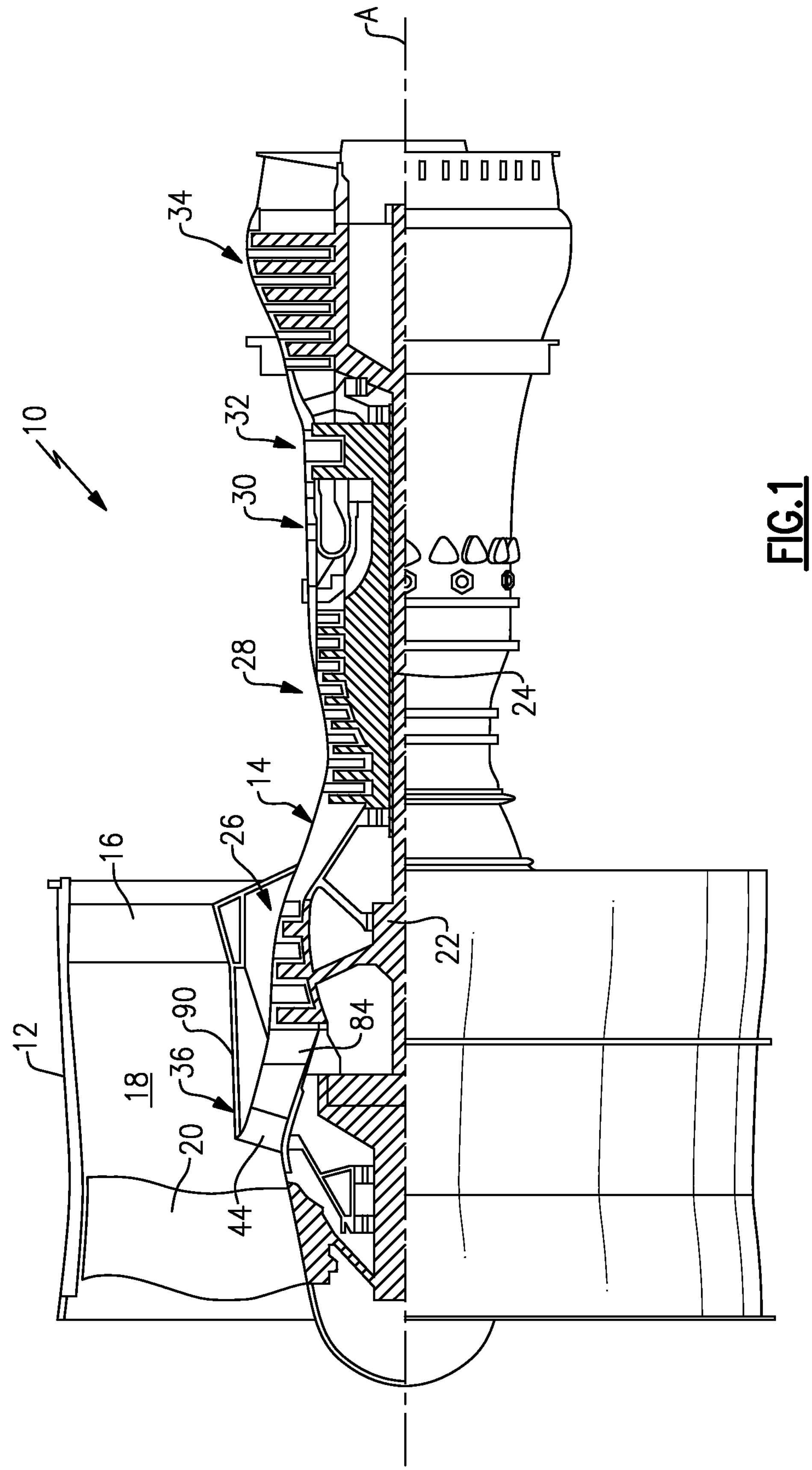
FIG. 1 is a schematic view of an example gas turbine engine.

A gas turbine engine 10 is illustrated schematically in FIG. 1. The gas turbine engine 10 includes a fan case 12 supporting a core 14 via circumferentially arranged flow exit guide vanes 16. A bypass flow path 18 is provided between the fan case 12 and the core 14. A fan 20 is arranged within the fan case 12 and rotationally driven by the core 14.

The core 14 includes a low pressure spool 22 and a high pressure spool 24 independently rotatable about an axis A. The low pressure spool 22 rotationally drives a low pressure compressor section 26 and a low pressure turbine section 34. The high pressure spool 24 supports a high pressure compressor section 28 and a high pressure turbine section 32. A combustor 30 is arranged between the high pressure compressor section 28 and the high pressure turbine section 32.

The core 14 includes a front architecture 36, having fixed structure, provided within the fan case 12 downstream from the fan 20. The front architecture 36 includes stator vanes 44 arranged upstream from inlet guide vanes 84, which are also arranged upstream from the first stage of the low compressor section 26.

Figure 2A:
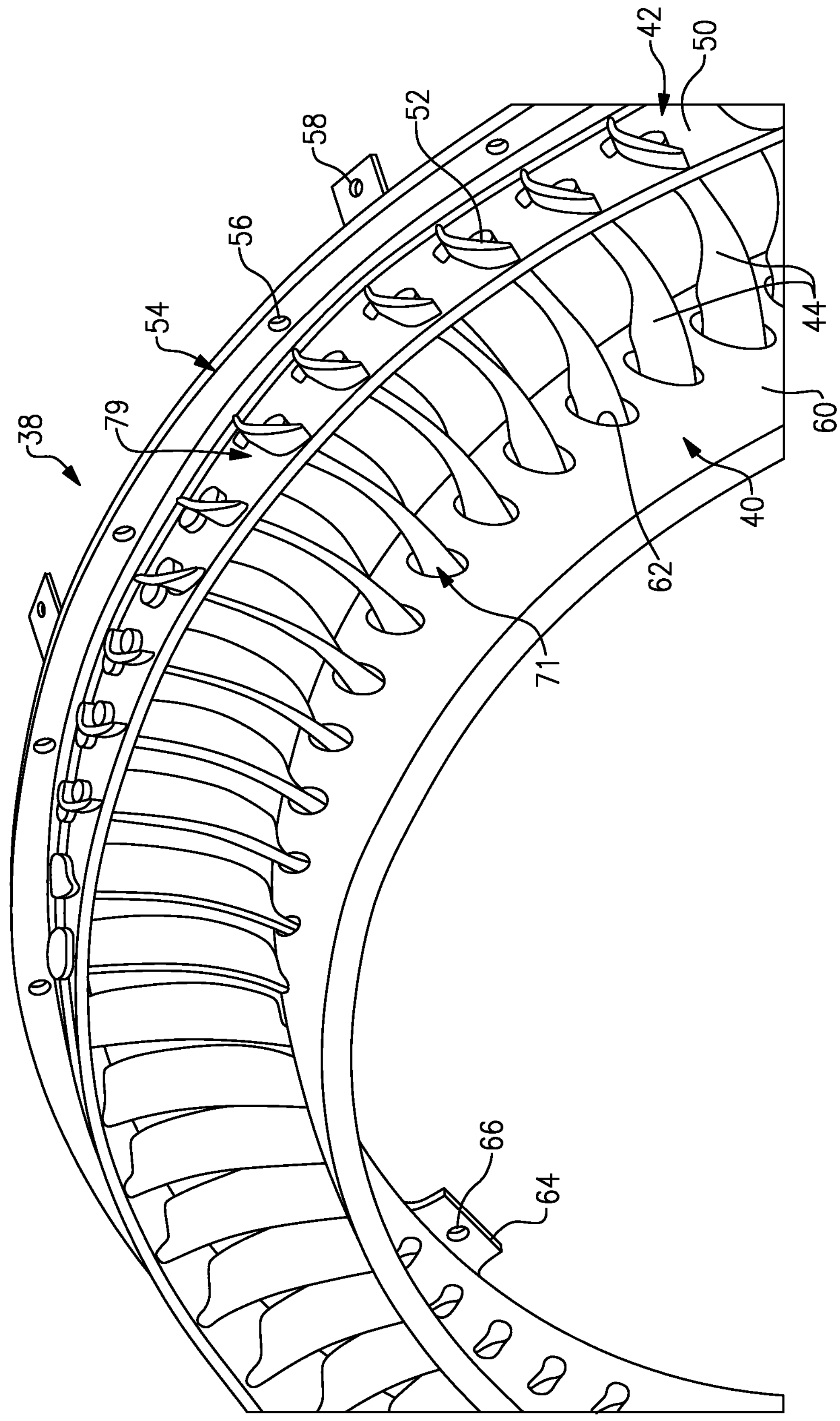
FIG. 2A is a partial perspective view of a stator vane assembly before applying sealant.
Figure 2B:
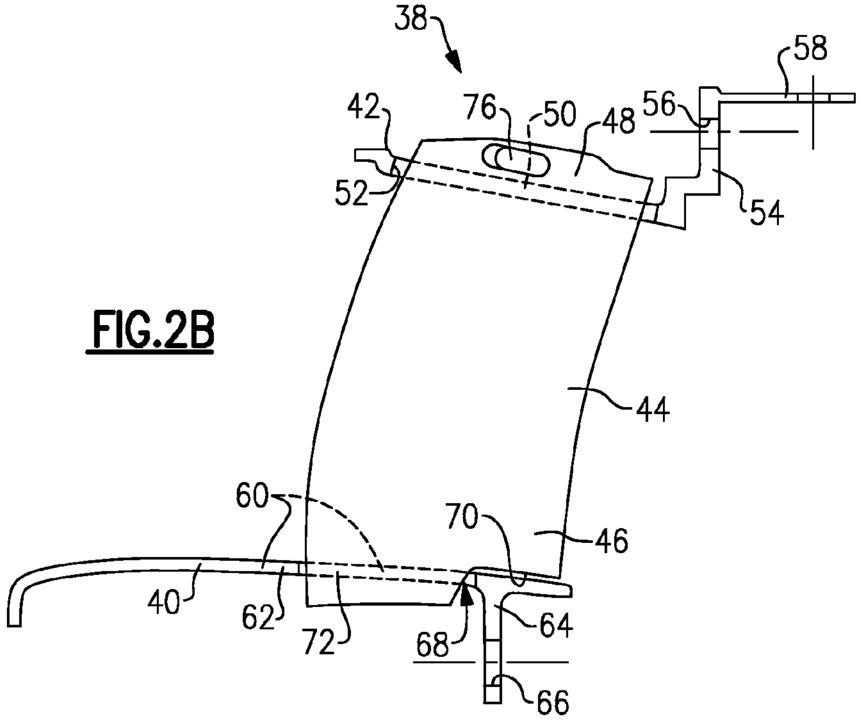
FIG. 2B is a cross-sectional view of the stator vane assembly shown in FIG. 2A.
Figure 6:
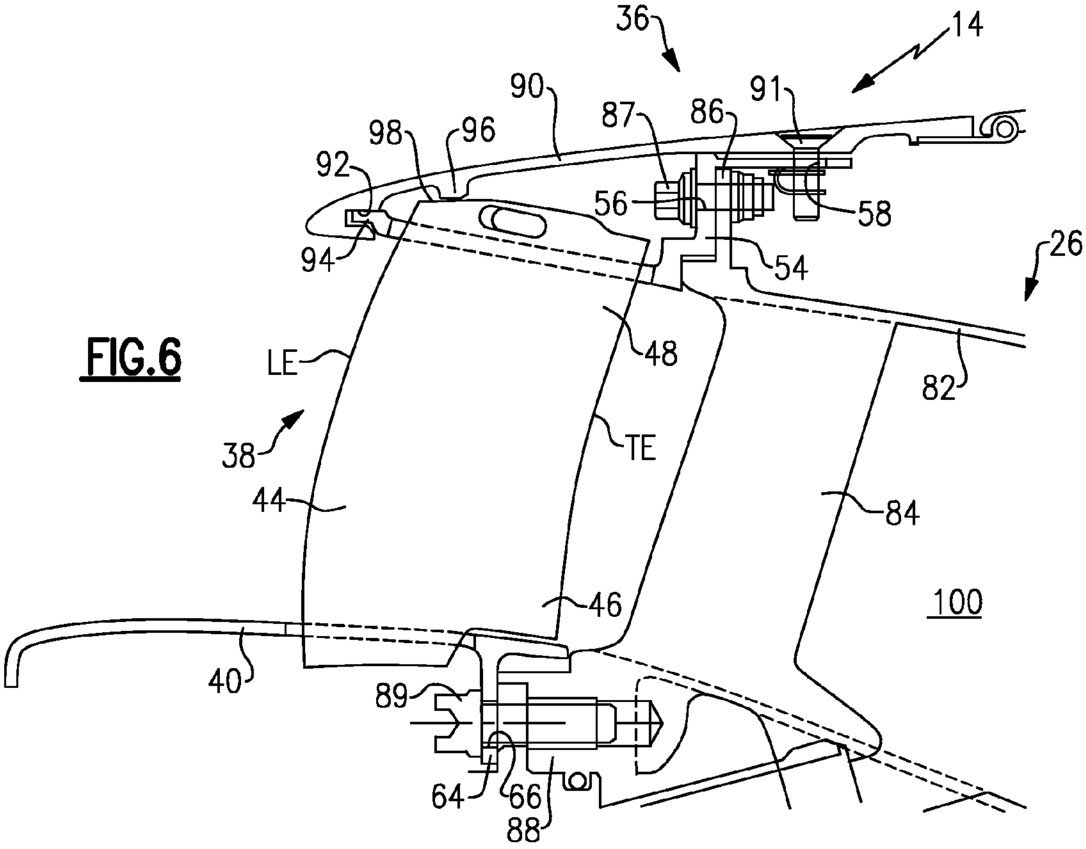
FIG. 6 is a cross-sectional view of a front architecture with the stator vane assembly shown in FIG. 2A.

The front architecture 36 supports a stator vane assembly 38, which is shown in FIGS. 2A, 2B and 6. The stator vane assembly 38 includes inner and outer fairings 40, 42 radially spaced from one another. Multiple stator vanes 44 are arranged circumferentially relative to one another about the axis A and extend between the inner and outer fairings 40, 42. The stator vanes 44 provide an airfoil having opposing sides extending between leading and trailing edges LE, TE (FIG. 6).

Each stator vane 44 includes opposing inner and outer ends 46, 48. The outer fairing 42 has a first wall 50 that includes circumferential first slots 52 for receiving the outer ends 48 of the stator vane 44. A first flange 54 extends from the first wall 50 and includes first and second attachment features 56, 58.

The inner fairing 40 is provided by a second wall 60 that includes circumferentially arranged second slots 62 for receiving the inner ends 46 of the stator vanes 44. A second flange 64 extends from the second wall 60 and provides a third attachment feature 66.

Figure 3A:
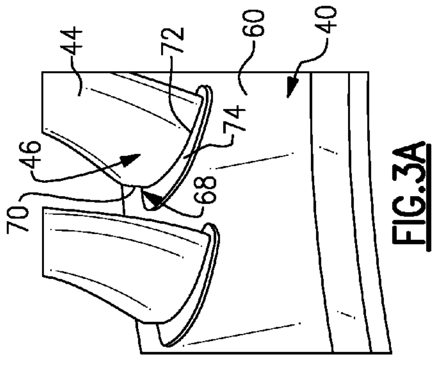
FIG. 3A is a top front perspective view of an inner end of the stator vane supported by an inner fairing.
Figure 3B:
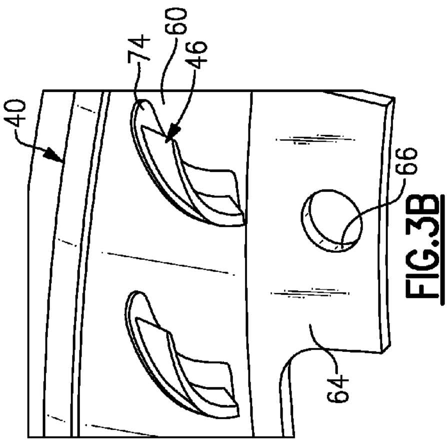
FIG. 3B is a bottom front perspective view of the inner stator vane shown in FIG. 3A.

Referring to FIGS. 3A-3B, the inner ends 46 are secured relative to the inner fairing 40 within the second slots 62 with a liquid sealant 74 that provides a bonded joint. In one example, the liquid sealant is a silicone rubber having, for example, a thicksotropic formulation or a room temperature vulcanization formulation. The liquid sealant cures to a solid state subsequent to its application about an inner perimeter 72 at the inner fairing 40, providing a filleted joint.

The inner end 46 includes a notch 68 at a trailing edge TE (FIG. 6) providing an edge 70 that is in close proximity to the wall 60, as illustrated in FIG. 2B, for example. The edge 70 provides an additional safeguard that prevents the stator vanes 44 from being forced inward through the inner fairing 40 during engine operation.

The stator vane 44 is supported relative to the inner fairing 40 such that a gap 71 is provided between the inner end 46 and the inner fairing 40 about the inner perimeter 72. Said another way, a clearance is provided about the inner perimeter 72 within the second slot 62. The liquid sealant 74 is injected into the gap 71 to vibrationally isolate the inner end 46 from the inner fairing 40 during the engine operation and provide a seal.

Figure 4:
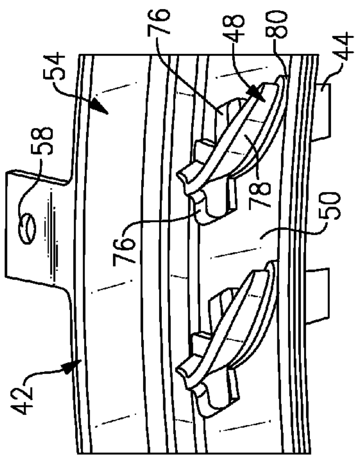
FIG. 4 is a top front perspective view of an outer end of the stator vane installed in an outer fairing.
Figure 5:
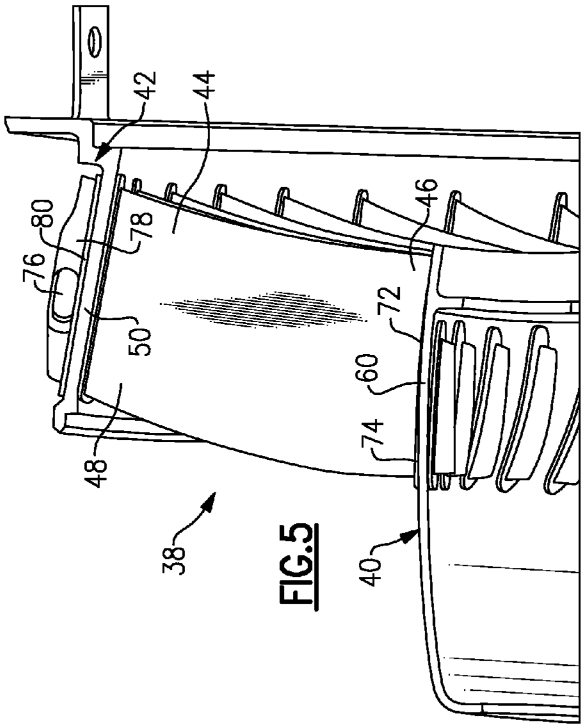
FIG. 5 is a side perspective view of a portion of the stator vane assembly with the sealant applied.

Referring to FIGS. 4-5, the outer ends 48 are secured relative to the outer fairing 42 within the first slots 52 with the liquid sealant 80 that provides a bonded joint. The liquid sealant cures to a solid state subsequent to its application about the outer perimeter 78 at the outer fairing 42, providing a filleted joint.

The stator vane 44 is supported relative to the outer fairing 42 such that a gap 79 is provided between the outer end 48 and the outer fairing 42 about the outer perimeter 78. Said another way, a clearance is provided about the outer perimeter 78 within the first slot 52. The liquid sealant 80 is injected into the gap 79 to vibrationally isolate the outer end 48 from the outer fairing 42 during the engine operation and provide a seal.

The outer end 48 includes opposing, laterally extending tabs 76 arranged radially outwardly from the outer fairing 42 and spaced from the first wall 50. The tabs 76 also prevent the stator vanes 44 from being forced radially inward during engine operation. The liquid sealant is provided between the tabs 76 and the first wall 50.

The front architecture 36 is shown in more detail in FIG. 6. An inlet case 82 includes circumferentially arranged inlet vanes 84 radially extending between and integrally formed with first and second inlet flanges 86, 88. The inlet case 82 provides a compressor flow path 100 from the bypass flow path 18 to the first compressor stage. The outer fairing 42 is secured to the first inlet flange 86 at the first attachment feature 56 with fasteners 87. The inner fairing 40 is secured to the second inlet flange 88 at the third attachment feature 66 with fasteners 89.

A splitter 90 is secured over the outer fairing 42 to the second attachment feature 58 with fasteners 91. The splitter 90 includes an annular groove 92 arranged opposite the second attachment feature 58. The outer fairing 42 includes a lip 94 opposite the first flange 54 that is received in the annular groove 92. A projection 96 extends from an inside surface of the splitter 90 and is arranged in close proximity to, but spaced from, an edge 98 of the outer ends 48 to prevent undesired radial outward movement of the stator vanes 44 from the outer fairing 42. The inner and outer fairings 40, 42 and splitter 90 are constructed from an aluminum 6061 alloy in one example.

The front architecture 36 is assembled by positioning the inner and outer fairings 40, 42 relative to one another. The stator vanes 44 are arranged circumferentially and suspended between the inner and outer fairings 40, 42. That is, the stator vanes 44 are mechanically isolated from the inner and outer fairings 40, 42. The liquid sealant is applied and layed in the gaps 71, 79, which are maintained during the sealing step, to vibrationally isolate the stator vanes 44 from the adjoining structure. The sealant adheres to and bonds the stator vanes and the inner and outer fairings to provide a flexible connection between these components. In the example arrangement, there is no direct mechanical engagement between the stator vanes and fairings. The sealant provides the only mechanical connection and support of the stator vanes relative to the fairings.

Since the sealant bonds the stator vanes to the inner and outer fairings, the stator vane ends are under virtually no moment constraint such that there is a significant reduction in stress on the stator vanes. No precision machined surfaces are required on the stator vanes for connection to the fairings. In one example, a stress reduction of over four times is achieved with the disclosed configuration compared with stator vanes that are mechanically supported in a conventional manner at one or both ends of the stator vanes. As a result of being subjected to considerably smaller loads, lower cost, lighter materials can be used, such as an aluminum 2014 alloy, which is also more suitable to forging. Since the liquid sealant is applied after the stator vanes 44 have been arranged in a desired position, any imperfections or irregularities in the slots or stator vane perimeters are accommodated by the sealant, unlike prior art grommets that are preformed.

Although an example embodiment has been disclosed, a worker of ordinary skill in this art would recognize that certain modifications would come within the scope of the claims. For that reason, the following claims should be studied to determine their true scope and content.

What is claimed is:

1. A method of assembling gas turbine engine front architecture comprising the steps of:

positioning inner and outer fairings relative to one another;

arranging multiple vanes circumferentially between the inner and the outer fairings, the arranging step includes inserting the vanes into first and second slots respectively provided in the outer and inner fairings, each vane includes an airfoil having outer and inner perimeters respectively received in the first and second slots, the arranging step includes providing gaps between the outer and the inner perimeters and the outer and inner fairings at their respective first and second slots, wherein the inner perimeters are suspended relative to the inner fairing and the outer perimeters are suspended relative to the outer fairing;

applying a liquid sealant around a perimeter of each end of the vanes at the both of the respective inner and outer fairings, the applying step includes laying the liquid sealant about both the inner and outer perimeters within their respective gaps, the applying step is performed subsequent to the arranging step and the gaps are maintained during the applying step; and bonding and supporting the ends of vanes relative to the one of the fairings with the liquid sealant, wherein there is no direct contact between the vanes and the inner and outer fairings, wherein the liquid sealant provides the only mechanical connection and support of the vanes relative to both the inner and outer fairings.

2. The method according to claim 1, wherein the liquid sealant is silicone rubber provided in one of a thixotropic formulation or a room temperature vulcanization formulation, the liquid sealant providing a solid seal in a cured state.

* * * * *